United States Patent
Camarda et al.

(10) Patent No.: US 9,264,190 B2
(45) Date of Patent: Feb. 16, 2016

(54) METHOD FOR DATA PACKET SCHEDULING IN A TELECOMMUNICATION NETWORK

(75) Inventors: Christian Camarda, Turin (IT); Marco Caretti, Turin (IT); Dario Sabella, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 186 days.

(21) Appl. No.: 14/111,620

(22) PCT Filed: Apr. 15, 2011

(86) PCT No.: PCT/EP2011/056004
§ 371 (c)(1),
(2), (4) Date: Oct. 14, 2013

(87) PCT Pub. No.: WO2012/139653
PCT Pub. Date: Oct. 18, 2012

(65) Prior Publication Data
US 2014/0036865 A1   Feb. 6, 2014

(51) Int. Cl.
*H04L 5/00* (2006.01)
*H04W 72/12* (2009.01)

(52) U.S. Cl.
CPC ............ *H04L 5/0007* (2013.01); *H04L 5/0057* (2013.01); *H04W 72/1263* (2013.01); *H04L 5/0035* (2013.01); *H04L 5/0053* (2013.01)

(58) Field of Classification Search
CPC ..... H04L 5/0007; H04L 5/003; H04L 5/0032; H04L 5/0044; H04L 5/0048; H04L 5/005; H04L 5/0051; H04L 5/0053; H04L 5/0057; H04W 72/12; H04W 72/1278
See application file for complete search history.

(56) References Cited

U.S. PATENT DOCUMENTS

| | | | |
|---|---|---|---|
| 8,509,133 B2* | 8/2013 | Novak | H04W 52/325 370/232 |
| 8,767,662 B1* | 7/2014 | Park | H04W 72/0406 370/329 |

(Continued)

FOREIGN PATENT DOCUMENTS

| | | |
|---|---|---|
| EP | 2 129 139 | 12/2009 |
| GB | 2 390 775 | 1/2004 |

(Continued)

OTHER PUBLICATIONS

International Search Report Issued Nov. 21, 2011 in PCT/EP11/56004 Filed Apr. 15, 2011.

*Primary Examiner* — Chi H Pham
*Assistant Examiner* — Weibin Huang
(74) *Attorney, Agent, or Firm* — Oblon, McClelland, Maier & Neustadt, L.L.P.

(57) ABSTRACT

A method scheduling data packets and control information in a telecommunication network for transmission in a group of OFDM symbols available in a transmission time interval. A set of the data packets to be scheduled is first selected by a scheduler, which then searches control solutions for scheduling control information associated to the set of data packets in a predetermined number of OFDM symbols of the OFDM symbol group. The scheduler searches data solutions for scheduling the selected data packets in other OFDM symbols available. The scheduler repeats searches of data and control solutions considering different sets of data packets and different numbers of OFDM symbols for scheduling control information. Finally, the scheduler schedules data packets and control information according to a scheduling solution, wherein control information is scheduled according to a control solution and data packets are scheduled according to a data solution associated to the control solution.

12 Claims, 5 Drawing Sheets

(56) References Cited

U.S. PATENT DOCUMENTS

| | | | |
|---|---|---|---|
| 9,030,958 B2 * | 5/2015 | Cai | H04W 72/04 370/252 |
| 2006/0013245 A1 * | 1/2006 | Abedi | H04L 12/5693 370/433 |
| 2010/0091724 A1 * | 4/2010 | Ishii et al. | 370/329 |
| 2010/0157922 A1 * | 6/2010 | Kim | H04L 5/0094 370/329 |

FOREIGN PATENT DOCUMENTS

| | | |
|---|---|---|
| WO | 2010 049003 | 5/2010 |
| WO | 2011 046475 | 4/2011 |

* cited by examiner

METHOD FOR DATA PACKET SCHEDULING IN A TELECOMMUNICATION NETWORK

TECHNICAL FIELD

The present invention relates to the field of telecommunication networks, and in particular to methods for scheduling data packets in a telecommunication network according to the preamble of claim 1. The invention finds preferred application to network with frequency division modulation (FDM), and more preferably of OFDM (Orthogonal Frequency Division Multiplexing) type. The invention also relates to a telecommunication network and to the radio equipments suitable for providing the above methods.

BACKGROUND ART

In packet switched transmissions, data transmitted between two equipments are organized into packets which include the information on the recipient of the packet. Packets sent from a user equipment, are received by the network that routes them to the final recipient, e.g. another user or a network server.

Since a public network provides services to a huge number of users sharing the same physical resources, resource allocation is of paramount importance to serve all users with the necessary Quality of Service (QoS).

An efficient resource allocation should take into account several parameters like Quality of Service (QoS) requirements, channel conditions of different users, priorities between different classes of services.

Packet scheduling is therefore an important task of the network, which is furthermore complicated in OFDMA (Orthogonal Frequency Division Multiplexing Access) networks (like Long Term Evolution—LTE), wherein resources shall be managed both in time and in frequency.

In LTE, the elementary radio resource for the scheduler is the TTI (Time Transmission Interval) which is divided in two parts (along the time dimension): control region (carrying control channels, e.g. PDCCH—Physical Downlink Control Channel) and data region (carrying data channels, e.g. PDSCH—Physical Downlink Shared Channel). These two regions are adjacent in the time dimension, and the total occupation is equal to 14 OFDMA symbols (in case of normal cyclic prefix).

The length of the control region can be set to 2-3-4 OFDMA symbols (in case of TTI containing up to 10 Physical Resource Blocks (PRBs)) or 1-2-3 OFDMA symbols (in case of TTI containing more than 10 PRBs), and this switching point between control and data region can be set by the system with a certain degree of freedom.

Known network solutions provides for fixing the number of OFDM symbols intended for DCI before deciding how to allocate data packets in the remaining data region. In other words, the known solutions provide first for deciding how many network resources are to be dedicated to downlink control information (DCI) and than for allocating the data packets in the remaining resources of the TTI.

UK patent application GB 2434279A discloses a method for resource allocation in a communication system. The method comprises setting specific time and frequency chunks within a band to provide localised resources for localised and distributed users. The signalling resources allocation for each user is in the chunk at the same frequency range of the allocated resources, or a subset of the frequency range. Scientific article "HARQ Aware Frequency Domain Packet Scheduler with different degrees of fairness for the UTRAN Long Term Evolution" (published in *Proceedings of the IEEE Vehicular Technology Conference (VTC)*, Dublin, Ireland, April 2007, by Pokhariyal, K. I. Pedersen, G. Monghal, I. Z. Kovacs, C. Rosa, T. E. Kolding, and P. E. Mogensen), discloses that by dividing the packet scheduler into a time domain and a frequency domain part the fairness between users can be effectively controlled. Different algorithms are applied in each scheduling part.

In the literature several other scheduling algorithms for OFDMA systems are known. In particular, scientific articles 'Optimal Power Allocation in Multiuser OFDM Systems', (published in IEEE GLOBECOM 2003 by Z. Shen, J. Andrews, B. Evans), 'Fair OFDMA Scheduling Algorithm Using Iterative Local Search with k-opt-Switches', (2008 by A. Ibing, H. Boche) and "MAC Scheduling Scheme for VoIP Traffic Service in 3G LTE", (published in VTC'2007, pp. 1441-1445, by S. Choi, K. Jun, Y. Shin, S. Kang, B. Choi) propose scheduling algorithms for OFDM systems. These articles do not consider separation between control region and data region in the radio subframe; the final solution is related only to a data region of OFDM subcarriers.

Applicants have perceived that, although several packet scheduling algorithms are known in the art, known solutions are not always that efficient, since they do not consider a cross dependency between data region and control region in terms of capacity. Since user data is transmitted over PDSCH (Physical Downlink Shared Channel) and scheduled in the TTI in a certain number of data packets (Transport Blocks), the system capacity depends on the number and on the size of Transport Blocks (TBs) scheduled in each TTI. Moreover, since the propagation environment is characterized by a fast fading process, the frequency selectivity of the channel quality is an important issue to be taken into account during the resource allocation phase (i.e. the choice of the frequency position in terms of PRBs occupied within a TTI of a certain TB to be transmitted); in fact, the spectral efficiency of a TB transmitted in a TTI depends also on the set of used PRBs in that TTI, then also the overall capacity depends on the particular resource allocation algorithm used.

Finally, since the switching point between control region and data region determines the amount of resources destined to these regions, the system capacity depends also on this parameter: as a consequence the number of OFDMA symbols reserved to the control influences the capacity of the data region; on the other side also the amount of resources reserved to the data region influences the capacity in the control region, with a consequent cross-dependence of the two regions in the TTI.

As a result, in general the optimal choice of the switching point depends on users channel conditions but also on the set of packets to be scheduled, and on the other side the number of packets that it's possible to transmit depends in turn on the switching point.

There's therefore the need for a packet scheduling method which takes into consideration also this cross dependency between control and data region of a TTI, so as to improve scheduling efficiency.

OBJECTS AND SUMMARY OF THE INVENTION

It is an object of the present invention to present a packet scheduling method and a relative network scheduler which are alternative to the known solutions.

Another object of the present invention is to present a packet scheduling method which allows for a more efficient allocation of the network resources. In particular it is an object of the present invention to present a packet scheduling method which takes into consideration cross dependency between control and data region of a TTI. According to the invention these and other objects are achieved by means of a method comprising the features of the annexed claims, which are an integral part of the present description.

The invention also relates to a network and a relevant radio equipment adapted to implement this method.

The inventors have considered implementing a scheduling method wherein a set of data packets to be scheduled is first selected by a scheduler. The latter searches control solutions for scheduling control information associated to the set of data packets in a predetermined number of OFDM symbols available in a predetermined transmission time interval. The scheduler also searches data solutions for scheduling the selected data packets in the other OFDM symbols available. Scheduler repeats the searches of data and control solutions considering a different set of data packets and a different number of OFDM symbols for scheduling control information. Finally, scheduler schedules data packets and control information according to a scheduling solution wherein control information are scheduled according to one of the control solutions found and data packets are scheduled according to a data solution associated to the control solution.

This solution provides the advantage that scheduling is accomplished by considering a wide range of scheduling solutions (potentially all possible solutions of the resource allocation problem) which takes into consideration both a variable number of data packets to be transmitted and a flexible switching point between data and control regions in a TTI. This has the effect of increasing efficiency in using the network resources.

In one aspect, scheduler first searches for control solutions in a predetermined number of OFDM symbols intended for DCI, and then, for each control solution found, it searches for data solutions for scheduling data in the data region.

This solution has the advantage of reducing computational cost of the scheduling algorithm, since it only searches data solutions for valid control solutions. If there are no valid control solutions, no data solution is searched. Since it is no sense to schedule data without the relative DCI, this solution reduces computational cost without losing good solutions.

In one aspect, the invention is also directed to a scheduling method wherein data packets are ordered according to a priority rule, and wherein the set of selected data packets is a set of data packets with higher order of priority.

This solution provides the advantage that scheduling is improved by taking into consideration both network resources and priority rules, like rules depending on the quality of service associated to each data packet to be transmitted.

In another aspect of the invention, where data packets are grouped in transport blocks, the set of data packets is selected in order to maximize the number of data packets that can be transmitted in the TTI. This solution has the advantage that allows taking efficiently into consideration constraints due to data that have to be transmitted together.

In a further aspect, data packets not scheduled for transmission in a first transmission interval because not considered by the best scheduling solution, are then stored and added to further data packets to be scheduled in a second transmission time interval. In particular, data that are not transmitted in the first TTI are prioritized in the second TTI, so that their chance to be scheduled in the second TTI are increased. In this way delivery time of data to a user is not increased too much.

In one aspect of the invention, control solutions are searched taking into consideration additional scheduling constraints, in particular by considering constraints for enabling CoMP (Coordinated Multi-Point) or persistent scheduling. In another aspect, the scheduling method provides the step of assigning a judgment to each scheduling solution. The judgment is based on a predetermined metric, whereby packets to be transmitted are scheduled according to the solution with best judgement with respect to the metric.

In another aspect, the invention is directed to a radio equipment comprising a control unit operatively connected to a transmission unit for wireless communication with a user equipment. The control unit comprises a scheduler for scheduling data and control information to be transmitted to the user equipment via the transmission unit. The scheduler is configured to implement a scheduling method according to the present invention.

Further objectives and advantages of the present invention will be clear from the following detailed description, wherein the invention is described with reference to non limitative examples illustrated in the annexed drawings.

BRIEF DESCRIPTION OF THE DRAWINGS

The invention will be presented herebelow with reference to non limiting examples, provided for explicative and non limitative reasons in the annexed drawings. These drawings illustrate different aspects and embodiments of the present invention and, where appropriate, reference numerals illustrating like structures, components, materials and/or elements in different figures are indicated by similar reference numbers.

DETAILED DESCRIPTION OF THE INVENTION

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the scope of the invention as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted. The noun "register" is used to indicate a readable memory area.

The term "transport block" is used to define the basic data unit exchanged between the physical layer and MAC layer. A transport block therefore defines a group of data accepted by the physical layer to be jointly encoded.

The term "resource element" is used to define each element in the time-frequency resource grid, and each resource element corresponds to one complex-valued modulation symbol transmitted by the eNodeB.

Figure 1:
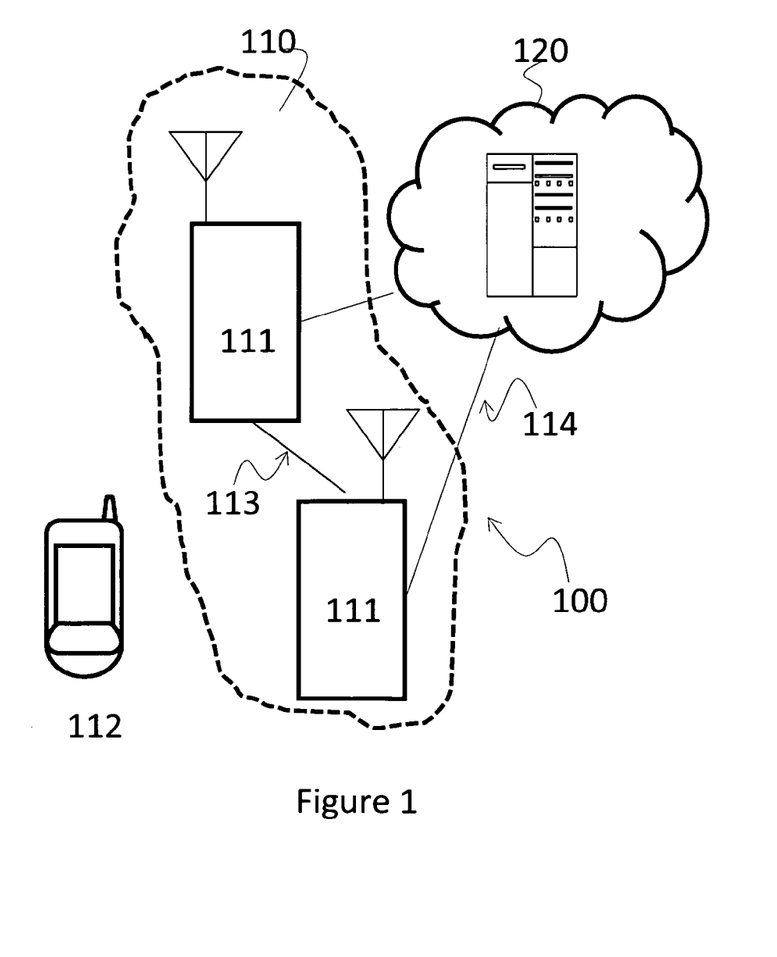
FIG. 1 illustrates a telecommunication network according to the invention.

In FIG. 1, disclosed is a wireless communication system, in particular a telecommunication network 100 comprising a wireless access subsystem 110 (also named E-UTRAN) and a core network 120.

Access subsystem 110 comprises access apparatuses 111 in wireless communication with user equipments (UEs) 112. In one embodiment, the access subsystem comprises also apparatuses for cable connection of a user equipment to the network. In the following description telecommunication network 100 is an LTE-A network and access apparatuses 111 are eNodeB apparatuses, nevertheless the invention is not limited to this type of network. As an example network 100 can be an LTE network (i.e. a network that, except for features of the present invention, operates according to 3GPP standard release 10) or any other type of FDM (e.g. OFDM or OFDMA) network requiring scheduling of data packet and control information to be transmitted to UEs accessing the network. Depending on the type of network, access apparatuses can be of different type and can be interconnected in different ways. eNodeBs 111 are interconnected with each other via a data interface 113 (indicated in dotted line in FIG. 1) that in LTE is known as X2 interface. X2 interface is based on IP protocol.

eNodeBs 111 are connected via an S1 interface 114 to the core network 120, which comprises server and databases (like Home Location Register) for providing services (like voice calls or VoIP calls) to the users connected via the access subsystem 110. In particular, core network 120 comprises MMEs (Mobility Management Entities) and Gateways for connection with other networks.

Figure 2:
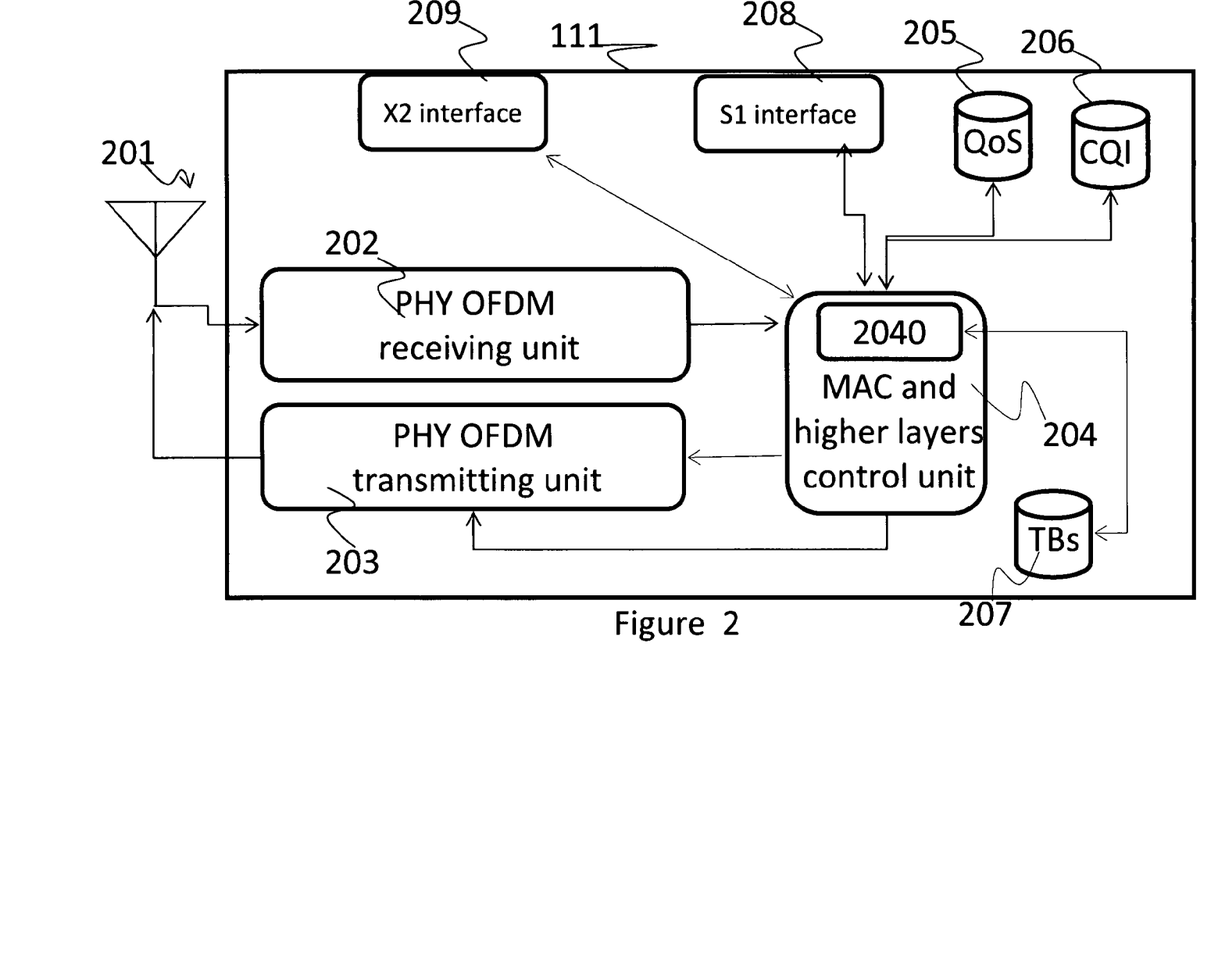
FIG. 2 illustrates a block scheme of a radio equipment of the network of FIG. 1.
Figure 3:
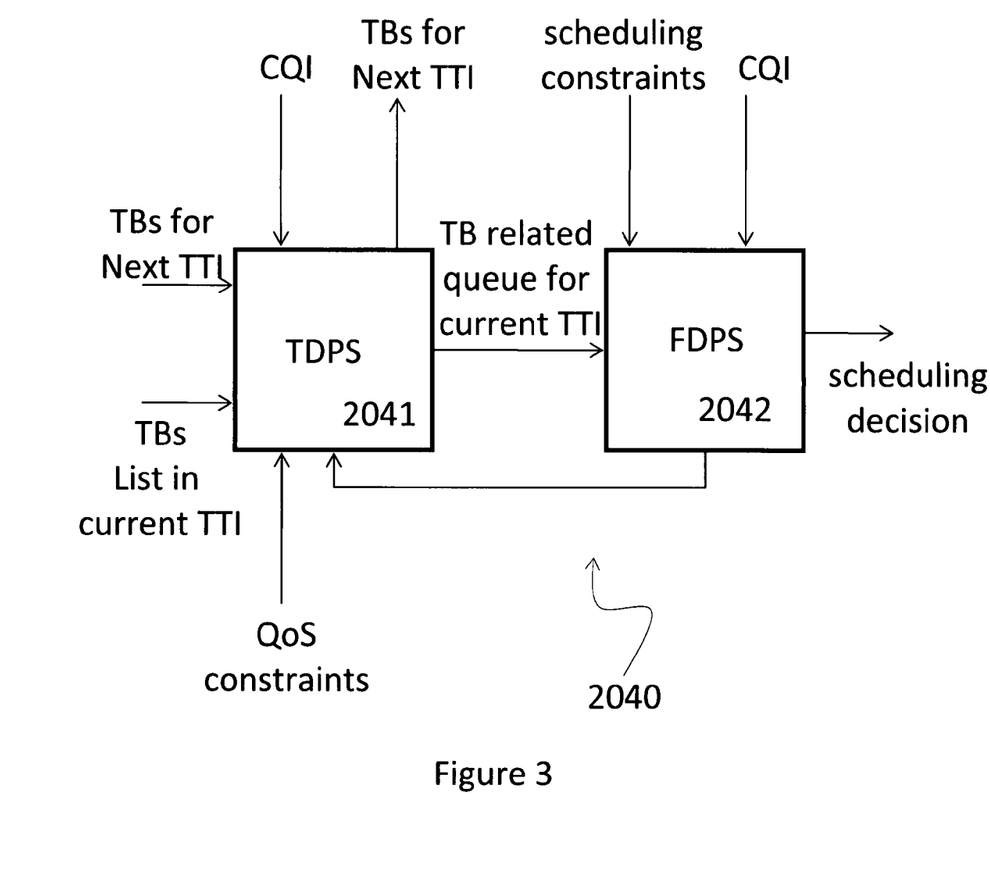
FIG. 3 illustrates a block scheme of a scheduler of the radio equipment of FIG. 2.

An example of eNodeB 111 according to the present invention is hereby disclosed with reference to FIGS. 2 and 3.

FIG. 2 discloses a block scheme of an eNodeB 111 according to a first embodiment of the invention. eNodeB 111 is a radio equipment suitable for establishing a wireless communication with a UE. To this end, eNodeB 111 comprises an antenna 201 operatively connected to a receiving unit 202 and a transmitting unit 203. Both receiving unit 202 and transmitting unit 203 implement all the functions at physical layer.

Since LTE is an OFDMA network, eNodeB 111 receiving unit 202 comprises an analogue to digital converter (ADC) followed by an OFDM decoder and eventually an error correction unit (e.g. a Forward Error Correction decoder). Receiving unit 202 receives data transmitted by a user equipment in an uplink channel and outputs data packets that may undergo further decoding processes by a control unit, preferably a microcontroller, 204 that implements higher layers functions of the protocol stack, like MAC and other functions up to the application layer.

Control unit 204 generates data to be transmitted in a downlink channel to a user equipment. This downlink data are then processed by transmission unit 203 that, in this embodiment, comprises an OFDM coder.

Control unit 204 is operatively connected to an S1 interface 208 and to an X2 interface 209 to communicate respectively with the core network 120 and other eNodeBs 111. Control unit 204 therefore receives, via interfaces 208 and 209, data to be transmitted to UEs served by the eNodeB. As an example, if a user is navigating the Internet, data retrieved are transmitted via the core network 120 to the eNodeB 111 via the S1 interface and then scheduled for transmission to the user. Other data to be transmitted to the UE can be generated locally by the control unit 204, e.g. messages for requesting the UE to report a CQI or other radio measures.

Control unit 204 comprises a scheduler 2040 for scheduling data packets and DCI to be transmitted to UEs in wireless communication with the eNodeB. Scheduler 2040 is preferably implemented as a software application run by a processor, nevertheless it can be implemented by means of hardware or a combination of hardware and software.

A block scheme of scheduler 2040 is presented in FIG. 3.

Scheduler 2040 is hierarchically organized in two packet scheduling stages. Scheduler 2040 therefore comprises a Time Domain Packet Scheduler (TDPS) module 2041 which defines a set of Transport Blocks (TBs) to be allocated, and a Frequency Domain Packet Scheduler (FDPS) module 2042 which attempts to allocate the set of TBs in the best way in the available network resources and having considered all the scheduling constraints that can be present (e.g. due to coordinates scheduling or to persistent scheduling).

TDPS module 2041 receives as input data to be transmitted and information necessary to prioritize packets to be transmitted.

In the preferred embodiment of FIG. 3, module 2041 receives as input a list of TBs to be transmitted in a current TTI, and a sequence of TBs not transmitted in a previous TTI and now in queue to be transmitted.

In order to prioritize data to be transmitted and to generate an output stream of TB to be transmitted in the current TTI, TDPS module 2041 receives as input QoS constraints and CQI (Channel Quality Information). These two pieces of information allow the TDPS scheduler to select a set of users with higher priority level and to generate a set of TBs according to the user scheduling priority and to choose their dimension (i.e. the transport block size TBS).

In the preferred embodiment, the list of TBs generated by TDPS module 2041 is a FIFO (First In First Out) queue. In other words, the sequence of TBs is ordered in decreasing mode of priority, i.e. TB in first position has highest priority and TB in last position has lowest priority.

This list of ordered TBs is provided to the FDPS (Frequency Domain Packet Scheduling) module 2042.

FDPS module 2042 receives also as input CQI and scheduling constraints. "Scheduling constraints" are information that shall be taken into consideration to correctly allocate resources, e.g. to enable CoMP (Coordinated Multi-Point) transmission and/or to enable persistent scheduling in the radio frame. Scheduling constraints define a subset of PRBs not available for dynamic scheduling performed by the FDPS.

Figure 4:
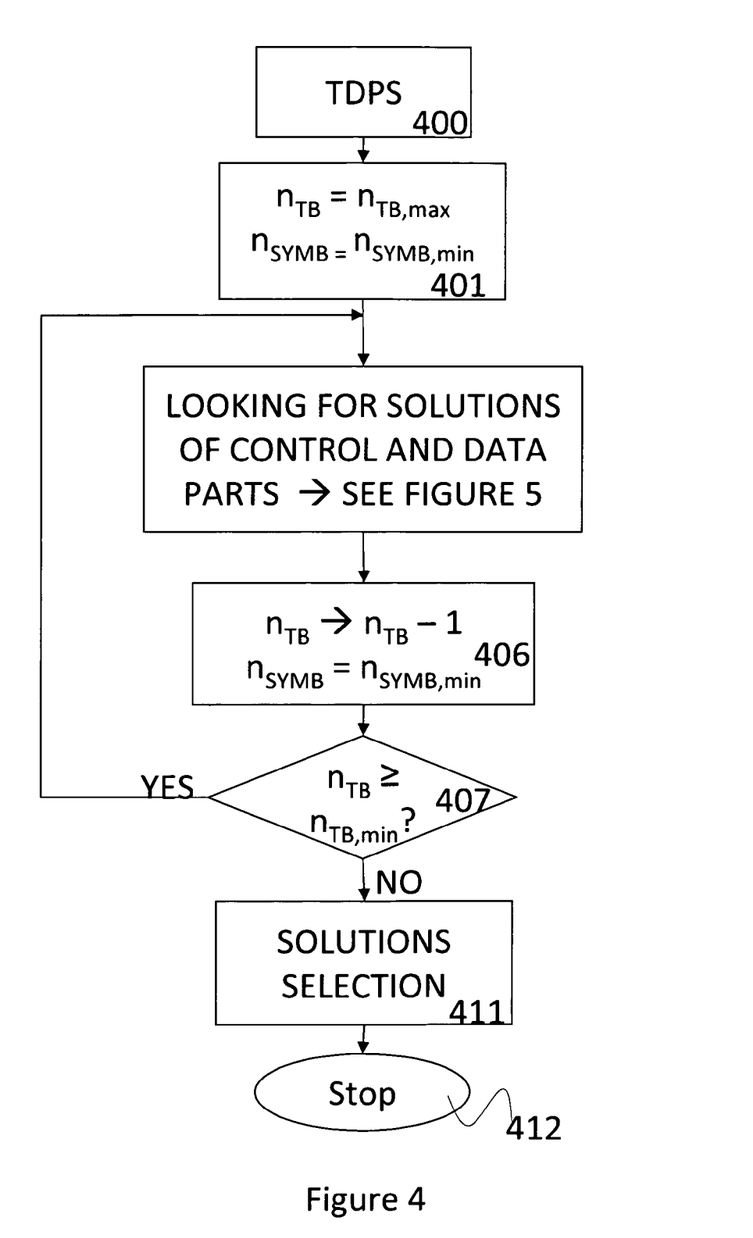
FIGS. 4 and 5 illustrate is a flow diagram illustrating a scheduling method according to a first embodiment of the present invention.
Figure 5:
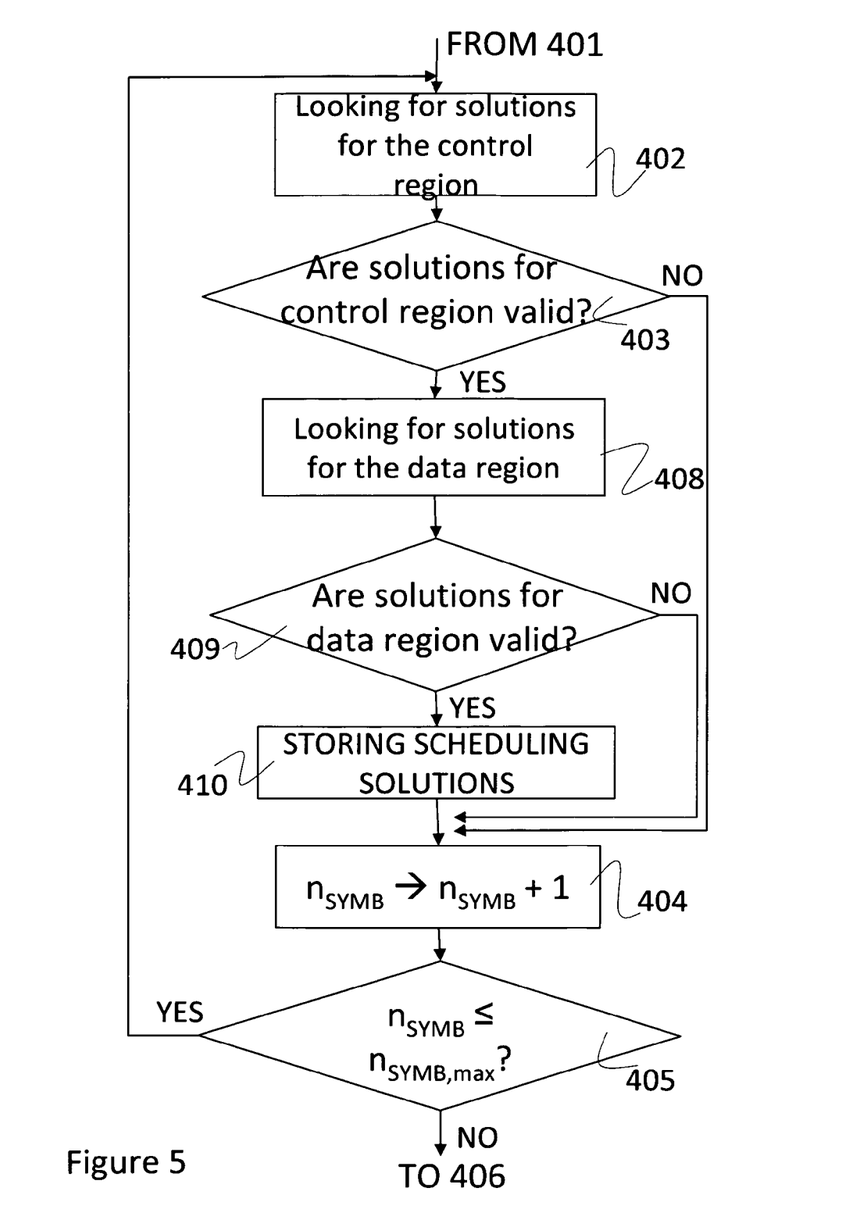

With reference to FIGS. 4 and 5, an algorithm for packet scheduling according to the present invention is described here below. The algorithm potentially tries to allocate different numbers of DCIs (and relative TBs) in all feasible configurations of TTI; it means that if, for example, the queue length is made of 2 TBs, then the algorithm tries to allocate:
  2 TBs (and DCIs) in a TTI with 1 OFDM symbol for control region (if system bandwidth is wide), then
  2 TBs (and DCIs) in a TTI with 2 OFDM symbols for control region, then
  2 TBs (and DCIs) in a TTI with 3 OFDM symbols for control region, then
  1 TBs (and DCIs) in a TTI with 1 OFDM symbol for control region, then
  1 TBs (and DCIs) in a TTI with 2 OFDM symbols for control region, then
  1 TBs (and DCIs) in a TTI with 3 OFDM symbols for control region.

It should be noted that the above allocation trials generate different scheduling solutions, i.e. different TTI allocations for control and data regions.

A certain metric should therefore be used by the scheduler for selecting the scheduling solution that can be considered the "optimal" one.

The method hereby described, shall be considered a non limitative embodiment of the present invention and it is executed by scheduler 2040 in each TTI.

The scheduling method starts at step 400, when TDPS module 2041 generates a queue of transport blocks ordered according to a priority rule based on the QoS (Quality of Service) requirements associated to all the services and taking onto account also the backlogged TBs (i.e. TBs relative to the previous TTI) and the CQI. In a preferred embodiment, QoS requirements are retrieved by scheduler 2040 from a local memory area 205 of the eNodeB 111. Alternatively or in combination with the local memory 205, scheduler 2040 retrieves QoS requirements from the core network 120, e.g. querying the Home Locator Register (HLR).

CQI is retrieved by scheduler 2040 from a local memory area 206 which is updated by the control unit 204 each time that it receives CQI from the UEs.

Backlogged TBs are retrieved by scheduler 2040 from a local memory area 207 which is updated by the scheduler itself at each TTI.

In step 401 the method is initialized. FDPS module 2042 selects from the queue a set of data packets (grouped in the TBs) to be scheduled. At the same step scheduler 2040 sets a predetermined number of OFDM symbols for transport of control information. In particular, the number of OFDM control symbols ($n_{SYMB}$) is first set to the minimum value admitted by the considered network configuration ($n_{SYMB,min}$), so as to search for control solution wherein data region is maxima. In this step TBs are selected so as to maximize the number of TBs that can be transmitted in the current TTI ($n_{TB,max}$); in one embodiment, the maximum number of TBs that can be transmitted is equal to the number of TBs in the queue received from TDPS module 2041. In an alternative embodiment the maximum number of TBs is computed considering the maximum number of bits that can be transferred from MAC to L1 in a TTI and the sizes of the TBs to be scheduled. In another preferred embodiment, since the TDPS module 2041 generates a queue of TBs ordered according to a priority rule, the set of data packets is selected as the biggest set of data packets with higher order of priority, the maximum number of TBs is therefore obtained by counting the TBs in the received order until the maximum network capacity. In any case the maximum number of TBs that can be transmitted is given by the number if PRB present in the TTI (because at least a TB occupies a single PRB).

These starting values are only one possible example for the initialization of the proposed method, and they should not be regarded as limiting for the present invention. Similarly, the order of exploration of the values of these parameters (number nu of TB and the number of OFDM symbols of the control region) can be different from that considered in this implementation.

After the TDPS module 2041 has provided the queue of TBs to be transmitted and the searching conditions have been set, the FDPS module 2042 starts (step 402) searching control solutions for scheduling DCI related to the TBs in the queue. The search is preferably an iterative search.

In order to search for control solutions, FDPS module is provided with all the information on scheduling constraints posed by the network, e.g. DCI format can be of different length depending on the CQI, therefore scheduler shall know how many resource elements are necessary to allocate each DCI.

Goodness of each control solution is judged by means of a control utility function which associates a control utility function value (i.e. a judgment) to each control solution found during the search at step 402.

In one embodiment, each control solution can be labeled with a control utility function value $m_c$ calculated as follows:

$$m_c(\alpha) = \left(\frac{n^c_{RE,free}}{n^c_{RE,tot}}\right)^{k \cdot \alpha} \cdot \left(\frac{\sum_{i=1}^{n_{TB}}(1 - BLER_i^c)}{N_{queue}}\right)^{1-\alpha} \in [0, 1] \quad (1)$$

wherein:
- $\alpha \in [0,1]$ is a parameter that permits to vary the objective of the scheduler. The more it's close to 0, the more the scheduler gives importance to the system throughput; the more it's near to 1, the more the energy efficiency is relevant.
- $BLER_i^c$ is the BLER (Block Error Rate) estimated for the DCI associated to the i-th TB of the queue.
- $N_{queue}$ is the number of the TBs in the queue generated by the TDPS module 2041.
- $n^c_{RE,free}$ is the number of Resource Elements (REs) not used in the control region of the TTI.
- $n^c_{RE,tot}$ is the number of REs in the control region of the TTI.
- $k \in [0,1]$ is a constant that acts as a proportionality factor and could be chosen for example in order to equilibrate the weight of the first factor (related to energy efficiency) of equation (1) with the second one (related to the throughput). As an example it can be chosen in order to have $m_c = 0.5$ when $\alpha = 0.5$ (and with a certain set of TBs at the input).

As a general idea, the purpose of the metric is to synthesize the goodness of a certain solution of the resource allocation problem for the control region, and in that specific case the more $m_c$ is closer to 1, the more the control solution is considered to be good. In the preferred embodiment, all possible control solutions found in step 402 are ordered in decreasing order according to the corresponding utility function value. All the solutions computed in step 402 are evaluated (step 403) in order to check if they are valid from a control information point of view (i.e. if all the DCI can be allocated in the control region according to requirements and capacity constraints). If all the possible solutions are not valid from a control information point of view, the algorithm goes to the step 404.

In step 404 the number of OFDM symbols of the control region is increased. At this stage it is checked if the maximum number of OFDM symbols for the control region is exceeded (step 405). If the answer is NO the algorithm jumps to the step 402, while in case the answer is YES the number of TBs to be selected from the queue (nu) is decreased and the number of OFDM control symbols ($n_{SYMB}$) is set to the minimum value admitted by the considered network configuration (step 406). After that, FDPS module 2042 evaluates (step 407) if the new number of TBs is greater or equal to a minimum value $n_{TB,min}$. If the answer is YES the method jumps to the step 402. If the answer is NO the method goes to the step 411 where the best solution, in terms of the utility function value, among all the previously stored solutions is selected. After that in step 412 the algorithm ends.

If at least one control solution generated in step 402 is considered as valid in step 403, the algorithm jumps to step 408.

In step 408 the FDPS module 2042 searches for data solutions, i.e. solutions for scheduling the TBs selected at step 401 in the data region, i.e. in the N−$n_{SYMB}$ OFDM symbols available in the TTI for transmitting TBs, wherein N is the total number of OFDM symbols in a TTI and $n_{SYMB}$ is the number of OFDM symbols allocated to DCI in the control solutions computed at step 402.

Data solutions are preferably computed through an iterative search. Alternatively, it is also possible to search for data solutions through an exhaustive full search algorithm.

As per the control solutions, goodness of each data solution is judged by means of a data utility function which associates a data utility function value (i.e. a judgment) to each data solution found during the search at step 408.

In one embodiment, each control solution can be labeled with a control utility function value $m_d$ calculated as follows:

$$m_d(\alpha) = \left(\frac{n^d_{RE,free}}{n^d_{RE,tot}}\right)^{k \cdot \alpha} \cdot \left(\frac{\sum_{i=1}^{n_{TB}} nbit_i(1 - BLER^d_i)}{\sum_{j=1}^{N_{queue}} nbit_j(1 - BLER^d_j)}\right)^{1-\alpha} \in [0, 1] \quad (2)$$

wherein:
  $\alpha \in [0,1]$ is a parameter that permits to vary the objective of the scheduler. The more it's close to 0, the more the scheduler gives importance to the system throughput; the more it's near to 1, the more the energy efficiency is relevant.
  $BLER^d_i$ is the BLER (Block Error Rate) estimated for the i-th TB considered for scheduling.
  $nbit_i$ is the number of bits of the i-th TB considered for scheduling.
  $nbit_j$ is the number of bits of the j-th TB of the queue.
  $BLER^d_j$ is the BLER (Block Error Rate) estimated for the j-th TB of the queue.
  $N_{queue}$ is the number of the TBs in the queue generated by the TDPS module 2041.
  $n^d_{RE,free}$ is the number of Resource Elements (REs) not used in the data region of the TTI.
  $n^d_{RE,tot}$ is the number of REs in the data region of the TTI.
  $k \in [0,1]$ is a constant that acts in the formula as a tuning value and could be chosen for example in order to equilibrate the weight of the first factor (related to energy efficiency) with the second one (related to the throughput). As an example it can be chosen in order to have $m_d$=0.5 when $\alpha$=0.5 (and with a certain set of TBs at the input).

As a general idea, the purpose of the metric is to synthesize the goodness of a certain solution of the resource allocation problem for the data region, and in that specific case the more $m_d$ is closer to 1, the more the data solution is considered to be good.

In the preferred embodiment, all possible data solutions found in step 408 are ordered in decreasing order according to the corresponding utility function value. In step 409 all solutions computed in step 408 are evaluated in order to check if they are valid from a TB allocation point of view. If all the possible solutions are not valid the algorithm jumps to the step 404, already described.

If there is at least one valid data solution among all the data solutions generated in step 408, FDPS module 2042 stores (step 410) all possible scheduling solutions (i.e. the combinations of control and data solutions) together with the associated control and data utility function values. Alternatively a unique scheduling value can be associated to the scheduling solutions. In one embodiment, this scheduling value is obtained by opportunely combining the control utility function value and the data utility function value respectively of the control and data solutions giving rise to the scheduling solution. In another embodiment, the scheduling value is obtained by means of a scheduling utility function. As an example, a scheduling value $m_s \in [0,1]$ (corresponding to the goodness of the solution) can be calculated by the following equation (3):

$$m_s(\alpha) = \left(\frac{n_{RE,free}}{n_{RE,tot}}\right)^{k \cdot \alpha} \cdot \left(\frac{\sum_{i=1}^{n_{TB}} r_i}{\sum_{j=1}^{N_{queue}} R_j}\right)^{1-\alpha} \in [0, 1] \quad (3)$$

wherein:
  $\alpha \in [0,1]$ is a parameter that permits to vary the objective of the scheduler. The more it's close to 0, the more the scheduler gives importance to the system throughput; the more it's near to 1, the more the energy efficiency is relevant.
  $r_i$ is the throughput achievable allocating the i-th TB considered for scheduling in the solution. It's function of the number of bits of i-th TB and the estimated BLER corresponding to the allocation choice of the scheduler.
  $R_j$ is the number of bits of j-th TB of the queue (i.e. the throughput of the j-th TB under the hypothesis of BLER=0), and the term $$\sum_{j=1}^{N_{queue}} R_j$$

gives the maximum system throughput achievable.
  $n_{RE,free}$ is the number of RE not used in TTI.
  $n_{RE,tot}$ is the number of RE in TTI.
  $k \in [0,1]$ is a constant that acts in the formula as a tuning value and could be chosen for example in order to equilibrate the weight of the first factor (related to energy efficiency) with the second one (related to the throughput). As an example it can be chosen in order to have $m_s$=0.5 when $\alpha$=0.5 (and with a certain set of TBs at the input).

As a general idea, the purpose of the scheduling value is to synthesize the goodness of a certain solution of the resource allocation problem for the considered TTI, and in that specific case the more $m_s$ is closer to 1, the more the solution is considered to be good.

After storing of the scheduling solutions (step 410), the algorithm jumps to the step 404 and other control and data solutions are searched wherein the number of OFDM symbols dedicated to DCI is increased.

As said before, when scheduling solutions have been searched considering all the possible number of OFDM symbols that can be allocated to DCI and all possible number of TBs, than the searches ends and a scheduling solution is selected between those stored at step 410. In particular, the scheduling method provides for selecting the scheduling solution that has the highest scheduling value, i.e. the solution that is judged as being the best according to the judgment metric used.

Data packets, in particular TBs, not scheduled for transmission by the selected scheduling solution, are increased in priority and stored in memory area 207 of the eNodeB 111. Stored TBs with increased priority are then added to further TBs to be scheduled in a successive TTI.

The following example shows working of an algorithm above described in a particular case.

Example

In this paragraph is shown a simple example of the algorithm. All the hypothesis and data are 3GPP compliant. The hypotheses are:
2 UEs to be scheduled
Bandwidth of 1.4 MHz (6 PRBs)
Resource allocation type 2 with localized PRBs
nsymb={2,3,4}
Length of the queue (from TDPS) of 3 TBs (nTBmax=3)
nTBmin=1
TB sizes are {392,32,904} bits, respectively for {TB1, TB2,TB3}
Exhaustive algorithms are used for allocation of DCIs and TBs
For simplicity, CQIs of users in general are supposed to be different PRB per PRB; in fact, even if CQI reporting from UE can be defined per subband, a processing unit internal to the eNB can generate (from UEs measurements) CQI values potentially different for each PRB (e.g. by means of such an interpolating function); as a consequence this assumption is transparent with respect to 3GPP constraints and the present example can be considered without loss of generality. In the following table CQI values are assumed:

|  | PRB1 | PRB2 | PRB3 | PRB4 | PRB5 | PRB6 |
|---|---|---|---|---|---|---|
| UE1 | 3 | 4 | 8 | 2 | 13 | 14 |
| UE2 | 7 | 5 | 2 | 2 | 7 | 10 |

The algorithm is the following (at each of the above steps the algorithm tries to allocate nTB transport blocks in the TTI configured with nsymb OFDM symbols for control region):
a. nTB=nTBmax=3. Available TBs are {TB1,TB2,TB3}
nsymb=2

Since 2 OFDM symbols are destined for control region, it means that the total number of Resource Elements (REs) in that region is equal to 144 (2 OFDM symbols, 6 PRBs, 12 subcarriers per PRB). At each step of the algorithm in which nsymb is initialized, first of all PCFICH (Physical Control Format Indicator Channel) and PHICH (Physical HARQ Indicator Channel) are inserted in the first OFDM symbol of the TTI (if present, also PBCH (Physical Broadcast Channel) could be considered), then the total number of REs available in the control region for the PDCCH is calculated. According to DCI allocation in control region defined in 3GPP LTE standard, the DCI occupation in terms of REs depends on the PDCCH format (number of CCEs allocated), that in turn depends on the channel quality and the target BLER for the control channel (as a consequence the exact calculation of the Res occupied by PDCCH depends on the particular AMC (Adaptive Modulation and Coding) algorithm implemented in the eNB). Let's suppose that for the particular CQI configuration in current TTI, the channel quality is so low that the DCI occupation is greater than the number of available REs in the control region. As a consequence, there are no control solutions for this configuration (because the transmission of the 3 DCI isn't enough efficient to fit the control region). →Nc=0 (number of possible solutions for the control region). The method therefore provides for going to the next iteration after increasing the number of OFDM control symbols.

b. nTB=nTBmax=3
nsymb=3

Even if in this case a greater number of OFDM symbols is allocated to the control region, let's suppose that for the particular CQI configuration in current TTI, the DCI occupation is greater than the number of available REs in the control region. As a consequence, there are no control solutions for this configuration (Nc=0). The method then provides for going to the next iteration after increasing the number of OFDM control symbols.

c. nTB=nTBmax=3.
nsymb=4

Let's suppose that for the particular CQI configuration in current TTI, the 3 DCI messages fit into the available REs in the control region (in all possible permutations, i.e. 6). As a consequence, according to DCI allocation in control region defined in 3GPP LTE standard, and depending on the particular CQI configuration in current TTI, there are 6 control solutions for this configuration (Nc=6). The algorithm tries to allocate 3 TBs in the TTI with 4 OFDM symbols for control region.

Also for data region the calculation of the exact occupation in terms of PRBs depends on the channel quality and the AMC algorithm implemented in the eNB. Let's suppose that for the particular CQI configuration in current TTI the occupation of 3 TBs is greater than the total number of PRBs available. As a consequence, there are no data solutions for this configuration→Nd=0 (number of possible solutions for the data region).

The method then provides for going to the next iteration after decreasing the number of available TBs and considering the minimum number of OFDM control symbols (step 106).

d. nTB=2. Available TBs are {TB1,TB2}.
nsymb=2

Also for this step previous considerations are valid. Let's assume that there are no control solutions for this configuration (Nc=0).

The method then provides for going to the next iteration.
e. nTB=2.
nsymb=3

Also for this step previous considerations are valid. Let's assume that there are no control solutions for this configuration (Nc=0).

The method then provides for going to the next iteration.
f. nTB=2
nsymb=4

Also for this step previous considerations are valid. Let's assume that there are 2 control solutions for this configuration (Nc=2).

$$S_1^c = \left\{ \begin{array}{l} [DCI1, DCI2], n_{REfree}^c = 64 \\ [DCI2, DCI1], n_{REfree}^c = 135 \end{array} \right\}$$

where $S_1^c$ is a column vector containing a first set of 2 control solutions, each of them implying a different number of free resource elements $n_{REfree}^c$ in the control region. Also for this step previous considerations are valid. Let's assume that there are 7 data solutions for this configuration (Nd=7).

$$S_1^d = \left\{ \begin{bmatrix} TB2 \\ - \\ TB1 \\ TB1 \\ TB1 \\ - \end{bmatrix}, \begin{bmatrix} TB2 \\ TB2 \\ TB1 \\ TB1 \\ TB1 \\ - \end{bmatrix}, \begin{bmatrix} TB2 \\ - \\ - \\ TB1 \\ TB1 \\ TB1 \end{bmatrix}, \begin{bmatrix} TB2 \\ TB2 \\ - \\ TB1 \\ TB1 \\ TB1 \end{bmatrix}, \begin{bmatrix} TB2 \\ - \\ TB1 \\ TB1 \\ TB1 \\ TB1 \end{bmatrix}, \begin{bmatrix} TB2 \\ TB2 \\ TB1 \\ TB1 \\ TB1 \\ TB1 \end{bmatrix}, \begin{bmatrix} - \\ - \\ TB1 \\ TB1 \\ TB1 \\ TB2 \end{bmatrix} \right\}$$

There are (Nc×Nd)=14 solutions (given by the combinations of all control and data solutions); the algorithm labels and orders that solutions.

g. The method then provides for going back to step 406 and decreasing the number of available TB (nTB=1) and considering the minimum number of OFDM control symbols. Available TB is {TB1} nsymb=2

Also for this step previous considerations are valid. Let's assume that there are no control solutions for this configuration (Nc=0).

The method then provides for going to the next iteration after increasing the number of OFDM control symbols.

h. nTB=1 nsymb=3

Also for this step previous considerations are valid. Let's assume that there is 1 control solution for this configuration (Nc=1).

$S_2^c = \{[DCI1J, n_{REfree}^c = 29]\}$

The algorithm tries to allocate 1 TB in the TTI with 3 OFDM symbols for control region.

Also for this step previous considerations are valid. Let's assume that there are 3 data solutions for this configuration (Nd=3).

$$S_2^d = \left\{ \begin{bmatrix} - \\ - \\ TB1 \\ TB1 \\ TB1 \\ - \end{bmatrix}, \begin{bmatrix} - \\ - \\ - \\ TB1 \\ TB1 \\ TB1 \end{bmatrix}, \begin{bmatrix} - \\ - \\ TB1 \\ TB1 \\ TB1 \\ TB1 \end{bmatrix} \right\}$$

There are (Nc×Nd)=3 solutions (given by the combinations of all control and data solutions); the algorithm labels and orders that solutions.

i. nTB=1 nsymb=4

Also for this step previous considerations are valid. Let's assume that there is 1 control solution for this configuration (Nc=1).

$S_3^c = \{[DCI1], n_{REfree}^c = 99\}$

The algorithm tries to allocate 1 TB in the TTI with 4 OFDM symbols for control region.

Also for this step previous considerations are valid. Let's assume that there are 3 data solutions for this configuration (Nd=3).

$$S_3^d = \left\{ \begin{bmatrix} - \\ - \\ TB1 \\ TB1 \\ TB1 \\ - \end{bmatrix}, \begin{bmatrix} - \\ - \\ - \\ TB1 \\ TB1 \\ TB1 \end{bmatrix}, \begin{bmatrix} - \\ - \\ TB1 \\ TB1 \\ TB1 \\ TB1 \end{bmatrix} \right\}$$

There are (Nc×Nd)=3 solutions (given by the combinations of all control and data solutions); the algorithm labels and orders that solutions.

j. Finally there are 14+3+3=20 solutions. The algorithm chooses the best one with the greater value of utility functions. In particular, considering the utility function introduced in equations (1) and (2), and depending on the value of alpha, it will be chosen a solution that gives a high throughput or that permits to obtain greater energy efficiency.

Further Embodiments

Notwithstanding the invention has been described with reference to a preferred embodiment of an LTE network, the invention is not limited to such a type of network. A person skilled in the art, in fact, can apply the teachings above described to any type of FDMA (Frequency Division Multiple Access), and in particular to OFDMA (Orthogonal Frequency Division Multiple Access), network wherein data and control packets have to be scheduled for transmission to a plurality of users. Moreover, the invention is not limited to the case of a wireless transmission, and the method for scheduling data can be applied to cable communications, one of which being provided with a scheduler as described above with reference to FIGS. 2 and 3. Even if the choice of the particular search algorithm used to find solutions for resource allocation in control region and data region doesn't modify the core of the invention, in a preferred embodiment searching of control and data solutions is carried out by means of Genetic Algorithms (GA).

GA are per se known and widely explored in literature; a GA is a search technique used in computing to find exact or approximate solutions to optimization and search problems. Genetic algorithms are categorized as global search heuristics and use techniques inspired by evolutionary biology such as inheritance, mutation, selection, and crossover. The evolution usually starts from a population of randomly generated set of feasible solutions (called individuals) and happens in generations. In each generation, the goodness (called fitness) of every individual in the population is evaluated, multiple individuals are stochastically selected from the current population (based on their fitness), and modified (recombined and possibly randomly mutated) to form a new population. The new population is then used in the next iteration of the algorithm. Commonly, the algorithm terminates when either a maximum number of generations has been produced, or a satisfactory fitness level has been reached for the population. If the algorithm has terminated due to a maximum number of generations, a satisfactory solution may or may not have been reached.

GA applied to LTE scheduling can be used for searching control and data solutions achieving quickly to a suboptimal solution.

Finally, those skilled in the art of telecommunication, will immediately realize that while the preferred scheduling method has been described with reference to a particular sequence of steps (FIGS. 4 and 5) implemented by a radio equipment disclosed with reference to particular functional blocks (FIGS. 2 and 3), the steps can be executed according to a different sequence, and can be implemented by means of a radio equipment comprises hardware and software components which implement one, more or only parts of the functions blocks above indicated. As an example, while in the preferred embodiment the scheduler searches first for control solutions and then for data solutions, it is possible to invert these steps and the scheduler can search first for data solutions and then for control solutions. In any event, the method provides for searching data and control solutions in control and data regions of different sizes by changing the number of OFDM symbols intended for DCI and/or the set of TBs to be scheduled.

The invention claimed is:

1. A method for scheduling data packets and control information in a telecommunication network, wherein the data packets and control information are scheduled for transmission in a group of OFDM symbols available in a transmission time interval, the method comprising:
   a) selecting a set of the data packets;
   b) searching control solutions for scheduling control information associated to the set of data packets in a predetermined number of OFDM symbols of the group of OFDM symbols;
   c) searching data solutions for scheduling the selected data packets in other OFDM symbols of the group of OFDM symbols;
   d) repeating b) and c) considering a different set of the data packets to be transmitted and a different predetermined number of OFDM symbols for scheduling the control information; and
   e) scheduling the data packets and the control information according to a scheduling solution, wherein the control information is scheduled according to a control solution found at b) and the data packets are scheduled according to a data solution found at c) and associated to the control solution.

2. The method according to claim 1, wherein b) is executed before c) and wherein c) is carried out for each control solution found at b).

3. The method according to claim 1, wherein before searching the control solutions or the data solutions, the method further comprises ordering the data packets according to a priority rule, and wherein the set of data packets is a set of data packets with higher order of priority.

4. The method according to claim 3, wherein the data packets are grouped in transport blocks, and wherein the set of data packets is selected to maximize a number of transport blocks that can be transmitted in a first transmission time interval.

5. The method according to claim 4, further comprising increasing priority of data packets not scheduled by the selected scheduling solution, storing the data packets with increased priority, adding the stored data packets with increased priority to further data packets to be scheduled in a second transmission time interval.

6. The method according to claim 3, wherein the priority depends on a quality of service associated to the data packets.

7. The method according to claim 1, wherein the control solutions at b) are searched taking into consideration scheduling constraints, or by considering constraints for enabling CoMP or persistent scheduling.

8. The method according to claim 1, further comprising assigning a judgment to each scheduling solution, wherein the control information is scheduled according to a control solution found at b) and the data packets are scheduled according to a data solution found at c) and associated to the control solution, the judgment being based on a predetermined metric, whereby packets to be transmitted are scheduled according to the solution with a best judgement with respect to the metric.

9. The method according to claim 8, wherein the judgment is calculated according to equation $$m_s(\alpha) = \left(\frac{n_{RE,free}}{n_{RE,tot}}\right)^{k \cdot \alpha} \cdot \left(\frac{\sum_{i=1}^{n_{TB}} r_i}{\sum_{j=1}^{N_{queue}} R_j}\right)^{1-\alpha} \in [0, 1]$$

wherein:
$\alpha \in [0,1]$ is a parameter;
$r_i$ is throughput achievable allocating the i-th Transport Block (TB) of each scheduling solution;
$R_j$ is a number of bits of j-th TB of a queue;
$n_{RE,free}$ is a number of RE not used in TTI;
$n_{RE,tot}$ is a number of RE in TTI; and
$k \in [0,1]$ is a constant.

10. The method according to claim 1, wherein the control solutions are first searched at b) considering the predetermined number of OFDM symbols as a minimum number of OFDM symbols that can be allocated to control information in the transmission time interval, and wherein d) provides for increasing the number of OFDM symbols.

11. A radio equipment comprising:
   a control unit operatively connected to a transmission unit for wireless communication with a user equipment,
   wherein the control unit comprises a scheduler for scheduling data and control information to be transmitted to a user equipment via the transmission unit, and
   wherein the scheduler is configured to implement a method according to claim 1.

12. A telecommunication network, comprising a plurality of access apparatuses for establishing a communication with a user equipment, wherein at least one of the plurality of access apparatuses is a radio equipment according to claim 11.

* * * * *